United States Patent Office 3,088,969
Patented May 7, 1963

3,088,969
MANUFACTURE OF t-BUTYL ESTERS OF UNSATURATED ACIDS
James L. Callahan, Bedford, Arthur F. Miller, Lyndhurst, John A. Stamm, Mayfield Heights, and Franklin Veatch, Lyndhurst, Ohio, assignors to The Standard Oil Company, Cleveland, Ohio, a corporation of Ohio
No Drawing. Filed Apr. 21, 1961, Ser. No. 104,533
2 Claims. (Cl. 260—486)

The present invention relates to a process for the manufacture of t-butyl esters of unsaturated aliphatic acids. More particularly, this invention relates to a process for the manufacture of t-butyl acrylate and t-butyl methacrylate by a catalytic reaction involving iso-butylene and the corresponding unsaturated acid.

It is generally known in the art that saturated aliphatic acids can be reacted with tertiary olefins such as iso-butylene in the presence of a hydration catalyst to form the corresponding esters. It has also been previously suggested that unsaturated acids such as acrylic or methacrylic acid can be reacted with tertiary olefins in the presence of a hydration catalyst to give the corresponding esters. Among the hydration catalysts known to be useful in such reactions are boron trifluoride and sulfuric acid. Nevertheless, all of the known processes have the disadvantage that large amounts of butylene polymers are produced when iso-butylene is employed as a raw material in the process. Polymerization of iso-butylene seems to take place much more rapidly than the ester formation in the presence of the known catalysts and, consequently, the processes of the prior art will invariably produce a product mix which contains appreciable amounts of butylene polymers.

It has now been discovered, however, that if the process conditions and the hydration catalyst are carefully selected, it is possible to operate a process which will produce the t-butyl esters of acrylic and methacrylic acid without appreciable formation of the butylene polymers which have characterized the processes of the prior art.

In brief, the process of this invention comprises the step of bringing together iso-butylene and acrylic or methacrylic acid in an aqueous medium in the presence of a hydration catalyst selected from the group consisting of phosphomolybdic acid and phosphoric acid. Mild conditions of temperature and pressure are employed in the process as will be explained more fully below. The product mix obtained in the process of this invention will include t-butanol and unreacted iso-butylene as well as the desired ester.

As indicated above, it is essential that the process of this invention be carried out in an aqueous medium. In the absence of a sufficient amount of water, the iso-butylene will polymerize and, in that event, little, if any, iso-butylene is available for ester formation. Hence, the amount of water employed as the reaction medium is a critical process variable. In general, the water to iso-butylene molar ratio should be in the range 0.1:1 to 2:1, and optimum results are obtained in the range of 0.75:1 to 1.5:1.

The molar ratio of iso-butylene to acrylic acid is also an important process variable. For the purposes of the process of this invention this ratio should be within the range of 1.1:1 to 2.5:1, and the optimum ratio appears to be about 2:1.

Relatively mild action temperatures are employed in the process and, in general, the process may be operated at temperatures in the range of 100° F. to 250° F. Optimum results are achieved at a temperature of about 212° F. In accord with well-known rules of chemistry, higher temperatures will favorably influence the reaction rate, and the reaction goes to substantial completion in a period varying between 15 minutes and 5 hours, depending upon the temperature at which the process is conducted. At 212° F., for example, the reaction will be substantially complete in about one hour.

As mentioned previously, the catalyst employed in the process of this invention is selected from the group consisting of phosphomolybdic acid or phosphoric acid. Only a small catalytic amount of the acid is required for the purposes of this invention. For example, in the case of phosphomolybdic acid, it is only necessary to employ an amount in the range of 0.1% to 5% by weight based on the amount of acrylic acid. Likewise, in the case of phosphoric acid, only a small amount is required and any amount in the range of 1% to 25% by weight based on the amount of acrylic acid will be sufficient.

The process of this invention may be conducted in either a batch or a continuous manner. However, because of the reaction times involved, it will usually be more economical to carry out the reaction in a batch manner utilizing conventional batch reaction vessels. The unsaturated esters formed in the process may be recovered from the reaction mixture by well-known and conventional means and the recovery of the esters presents no unusual problems. For example, fractional distillation is a particularly convenient method of effecting the recovery of this type of product. When fractional distillation is employed to recover the esters, it is customary to add a polymerization inhibitor to the mixture being distilled in order to prevent the polymerization of the esters during the distillation. Many suitable inhibitors are known to those skilled in the art.

The invention will be better understood by reference to the following illustrative examples:

Example I 1.56 moles of acrylic acid, 1.56 moles of water and 1 gram of phosphomolybdic acid were placed in a 1 liter capacity Parr pressure reactor stirred autoclave. Next, 3.2 moles of iso-butylene were added to the reactor under pressure. The charged reactor was then placed in a furnace where it was maintained at a temperature of 212° F. for two hours. A chromatographic analysis of the reaction mixture indicated that 22% of the iso-butylene was converted to t-butyl acrylate and that 37.1% of the iso-butylene was converted to t-butanol. Only a small amount of butylene dimer was formed.

Example II

Example I was repeated except that 15 cc. of phosphoric acid was substituted for the phosphomolybdic acid. The amounts of the other reactants and the reaction conditions were the same as for Example I and a chromatographic analysis of the reaction mixture indicated that 21.6% of the iso-butylene was converted to t-butyl acrylate while 49.5% of the iso-butylene was converted to t-butanol. The amount of iso-butylene converted to the dimer was less than 4%.

It is apparent from the foregoing description that the process of the present invention provides a rapid and convenient method for converting iso-butylene to an ester of an unsaturated acid. Moreover, the process also yields substantial quantities of t-butanol which is also a very useful material.

It will be obvious to those skilled in the art that many modifications of this process may be made without departing from the spirit or scope of the invention and this application for Letters Patent is intended to cover all such modifications as would reasonably fall within the scope of the appended claims.

We claim:
1. A process for the manufacture of t-butyl acrylate comprising the step of reacting iso-butylene with acrylic acid in an aqueous medium at a temperature in the range of 100° F. to 250° F. and in the presence of a catalyst selected from the group consisting of phosphomolybdic and phosphoric acids.

2. A process for the manufacture of t-butyl methacrylate comprising the step of reacting iso-butylene with methacrylic acid in an aqueous medium at a temperature in the range of 100° F. to 250° F. and in the presence of a catalyst selected from the group consisting of phosphomolybdic and phosphoric acids.

References Cited in the file of this patent

UNITED STATES PATENTS 2,917,538   Carlyle _____ Dec. 15, 1959

FOREIGN PATENTS 814,360   Great Britain _____ June 3, 1959